United States Patent Office 2,805,213
Patented Sept. 3, 1957

2,805,213

INTERPOLYESTERS PREPARED FROM MIXTURES OF P,P'-SULFONYL DIBENZOIC ACID AND CYCLIC ALIPHATIC DICARBOXYLIC ACIDS

John R. Caldwell and John W. Wellman, Kingsport, Tenn., assignors to Eastman Kodak Company, Rochester, N. Y., a corporation of New Jersey No Drawing. Application April 9, 1954,
Serial No. 422,278

23 Claims. (Cl. 260—75)

This application relates to valuable linear polyesters prepared by condensing a p,p'-sulfonyldibenzoic acid or diester together with a cyclic aliphatic dicarboxylic acid or diester and a polymethylene glycol.

It is an object of this invention to provide novel interpolyesters as described herein. It is another object to provide a process as described herein for preparing valuable interpolyesters. Other objects will become apparent hereinafter.

This application is somewhat related to copending applications, Serial Nos. 313,061, 313,063, 313,064 and 313,066 filed on October 3, 1952, now U. S. Patent Nos. 2,744,089, 2,744,091, 2,744,092, and 2,744,094, respectively. In those applications and in U. S. Patent 2,614,120, issued October 14, 1952, there are disclosed various polyesters prepared from sulfonyldibenzoic acid and other aliphatic or aromatic dibasic acids.

Highly polymeric esters of terephthalic acid and various glycols, for example, ethylene glycol, trimethylene glycol, hexmethylene glycol, etc., are well known, and have been used in the preperation of linear, highly polymeric polyesters having properties including that of being capable of being formed into useful filaments, fibers and the like, and having high melting points and a low degree of solubility in organic solvents. Linear polyesters prepared from other aromatic dicarboxylic acids have also been described in the prior art and contemporary art.

Interpolyesters of terephthalic acid and other dibasic acids condensed with dihydroxy compounds have also been described.

None of the polyesters known in the prior art are easily prepared in such a way that they possess the herein-described highly advantageous properties which render the polyesters of this invention especially suitable for processing by injection molding and extrusion methods.

It has been found that p,p'-sulfonyl dibenzoic acid or its esters or its acid chloride plus a cyclic aliphatic dicarboxylic acid or diester thereof or its acid chloride can be condensed with a polymethylene glycol (or such a glycol combined with an aliphatic ether glycol) to produce a new kind of linear interpolyester having highly valuable properties which are superior to those of the linear polyesters described in the prior art. Thus, our new interpolyesters can be prepared having a relatively wide softening range and good flow characteristics whereby they are quite valuable for the production of shaped objects by injection molding or extrusion methods. In this respect, they differ from most types of high-melting linear polyesters, such as polyethylene terephthalate, which possess sharp melting points. Thus, these modified polyesters of sulfonyl dibenzoic acid soften over a sufficiently wide temperature range that they can be advantageously employed in the production of shaped objects by injection molding and extrusion methods. These novel interpolyesters can be prepared so as to soften at temperatures which are above about 150° C. They also have other especially valuable properties. The novel interpolyesters described herein are quite useful in the making of electrical insulation, photographic film base, strong elastic fibers, gaskets, flexible tubing, fabrics, etc.

These novel interpolyesters can be prepared so as to have especially valuable properties when formed into fibers by melt spinning methods followed by cold drawing and heat-setting. The fibers obtained can be readily dyed with cellulose acetate dyes.

Among the outstanding qualities of the interpolyesters of this invention are their excellent dimensional stability and low degree of water absorptivity. This results in superior resistance to dimensional change despite changes in atmospheric humidity or immersion in aqueous solutions.

The interpolyesters of this invention have melting points which are up to as much as or more than 50° C. higher than corresponding interpolyesters prepared from many of the dibasic acidic compound combinations described in the prior art. This characteristic results in a much greater effective range of utility for these new interpolyesters, for instance, gaskets can be prepared for employment in equipment operating at higher temperatures, fibers can be made which withstand higher ironing temperatures when fabrics are prepared from yarns incorporating these fibers, etc.

One embodiment of this invention relates to a process for preparing an interpolyester comprising (A) condensing about 10 mole proportions of a dicarboxylic diphenyl sulfone compound having the formula:

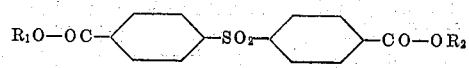

wherein $R_1$ and $R_2$ each represents a substituent selected from the group consisting of a hydrogen atom and an alkyl radical containing from 1 to 6 carbon atoms, plus from about 1 to about 30 mole proportions of a cyclic aliphatic dicarboxylic compound selected from the group consisting of the ortho-, meta- and para-isomers of cyclohexane dicarboxylic acid, the ortho-, meta- and para-isomers of 1,4-endomethylenecyclohexane dicarboxylic acid and the alkyl monoesters and alkyl diesters of all of these acids wherein the alkyl radicals contain from 1 to 6 carbon atoms, (B) with a dioxy compound selected from the group consisting of polymethylene glycols containing from 2 to 10 carbon atoms and lower alkanoic mono- and diesters of these glycols wherein the alkanoic groups contain from 2 to 4 carbon atoms, the dioxy compound being employed in such a proportion that there is at least an equivalent amount of oxy substituents in proportion to the carboxy substituents in the overall combination of the dicarboxylic compounds and the dioxy compounds, (C) in the presence of an ester-interchange catalyst selected from the group consisting of the alkali metals, the alkaline earth metals, the oxides of these two groups of metals, the alkoxides containing from 1 to 6 carbon atoms of these two groups of metals, the carbonates and borates of these two groups of metals, lead oxide, and compounds having the following formulas:

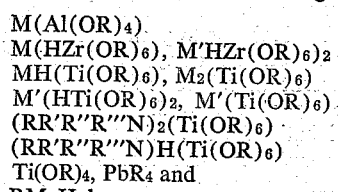

wherein M represents an alkali metal, M' represents an alkaline earth metal selected from the group consisting of magnesium, calcium and strontium, R represents an alkyl group containing from 1 to 6 carbon atoms, R', and R" and R'" each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

Advantageously, the dioxy compound can be employed in such a proportion that there are from about 1.2 to about 3 oxy substituents in proportion to the carboxy substituents in the overall combination of the dicarboxylic compounds and the dioxy compounds. More advantageously, the range of proportions is from 1.25 to about 2.0. Advantageously the low pressure referred to under (F) is less than about 15 mm. of Hg pressure. Advantageously, the elevated temperature employed during the earlier part of the condensation is above about 170°; the elevated temperature during the latter part can be as high as about 300° C.

Advantageously, the dioxy compound is a polymethylene glycol having the formula:

$$HO-(CH_2)_p-OH$$

wherein $p$ is a positive integer of from 2 to 10.

The dioxy compounds defined above may not actually contain any free hydroxy radicals since they may be in esterified form as indicated. Each dicarboxylic compound is considered as containing two carboxy radicals as that term is employed in the definition of the process as described above; either $R_1$ or $R_2$ may be alkyl radicals or hydrogen atoms.

Furthermore, this invention covers a process as defined above wherein esters of the two dicarboxylic compounds are formed by a preliminary step comprising condensing free p,p'-sulfonyl dibenzoic acid and/or the free cyclic aliphatic acid with a polymethylene glycol which is employed in the proportions set forth under (B), at an elevated temperature, after which preliminary step the condensing agent which is defined under (C) is added and the condensation is completed as defined under (D), (E) and (F). Advantageously the elevated temperature employed during the preliminary step is substantially that at which reflux conditions subsist; however, higher and lower temperatures can also be employed. Advantageously, as indicated above the polymethylene-glycol is employed in such a proportion that there are from about 1.2 to about 3 oxy substituents in proportion to the carboxy substituents in the overall combination of the free acid dicarboxylic compounds and the polymethylene glycol.

The polymethylene glycols (dioxy compounds) which can be employed to form highly polymeric linear polyesters include the following examples: ethylene glycol, trimethylene glycol, tetramethylene glycol, hexamethylene glycol, decamethylene glycol, etc. As indicated above, mono or diesters of these glycols can also be employed. Thus, the acetates, propionates and butyrates are examples of such esters. Ether glycols can be employed in admixture with polymethylene glycols. Examples of ether glycols include diethylene glycol, triethylene glycol, etc. When mixtures of polymethylene glycols and ether glycols are employed, it is generally preferable to employ a major proportion of the polymethylene glycol in order to obtain higher melting linear polyesters. The high melting characteristic also is dependent upon the amount of cyclic aliphatic dicarboxylic compound present in the interpolyester and the chain length of the glycol employed. Higher proportions of the cyclic aliphatic dicarboxylic compound lower the melting and softening temperatures of the interpolyesters. The same effect is created by employing a longer chain (higher carbon content) polymethylene glycol. For example, when a 10 carbon atom glycol is employed, the amount of aliphatic ether glycol used should preferably be not more than about 10–20 mole percent; whereas, when a 2–4 carbon atom glycol is employed the amount of ether glycol can be considerably higher (up to about 50 mole percent of the total quantity of dioxy compounds employed). When the proportion of cyclic aliphatic dicarboxylic compound is rather low and no ether glycol is employed, it is advantageous to employ polymethylene glycols containing at least 4 carbon atoms.

The advantageous ratio of p,p'-sulfonyldibenzoic acid or diester to the cyclic aliphatic dicarboxylic acid or diester will depend upon the type of product desired. As the mole percent of the latter modifying acid in the polyester is increased, the melting point of the product is lowered. When short chain glycols such as ethylene glycol and tetramethylene glycol are used, it is usually preferable to employ from 1 to 3 moles of the cyclic aliphatic dicarboxylic acid or diester for each mole of p,p'-sulfonyldibenzoic diester in order to keep the melting point of the product below its decomposition temperature. When higher glycols such as pentamethylene, hexamethylene, and octamethylene glycol are used, from about 1 to about 7 or 8 moles of the cyclic aliphatic dicarboxylic compound (e. g. the diester) can be employed for each ten moles of p,p'-sulfonyl dibenzoic compound.

Our novel interpolyesters may contain as constituents thereof small percentages of the m,m'- and/or the m,p'-isomers of the p,p'-sulfonyl dibenzoic compound without significant deleterious effect on the properties of these interpolyesters. In fact, when the interpolyester is to be employed for purposes other than for making fibers, substantial quantities of these isomers can be employed with some advantageous results, especially as regards increasing the softening temperature range.

The ester-interchange catalytic condensing agents which can advantageously be employed have been described above. From about 0.005% to about 0.2% of such catalysts based on the weight of the reactants being condensed can be employed. Higher or lower percentages can also be employed. Generally, from about 0.01% to about 0.06% of the catalytic condensing agent can be advantageously employed based on the weight of the various diesters being condensed. Other ester-interchange catalysts can also be employed in lieu of these set forth above.

The temperature at which polyesterification can be conducted is dependent upon the specific reactants involved in any given reaction. In general, the reaction mixture can be heated at from about 170° to about 220° C. for from approximately two to three hours in an inert atmosphere (e. g. nitrogen or hydrogen); the mixture can then be heated at from about 220°–240° to about 280°–300° C. in the same atmosphere for approximately ½ to 2 hours. Finally, the pressure can be greatly reduced to form a vacuum (less than about 15 mm. of Hg pressure but preferably on the order of less than 1 mm. of Hg pressure) while the temperature is maintained in substantially the same range (about 240°–300° C.); these conditions are advantageously maintained for approximately 4 to 6 additional hours. This final phase is advantageously carried out with agitation under the high vacuum in order to facilitate the escape of volatile products from the highly viscous melt. The described conditions can be varied considerably depending upon the degree of polyesterification desired, the ultimate properties sought, the stability of the polyester being produced, and the use for which the product is intended. Thus, the extent of the replacement of the sulfonyl dibenzoic acid or diesters with the cyclic aliphatic dicarboxylic acid or diesters necessitates variations in these conditions of temperature, pressure and time periods required.

It has been found that the type of catalyst used has an important bearing upon the properties of the final product. Although most of the catalysts cited in the prior art may be used, it has been found that certain novel catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell applications, Serial No. 313,072, now Patent No. 2,720,502, Caldwell and Reynolds Serial No. 313,077, now Patent No. 2,720,506, Wellman and Caldwell Serial No. 313,074, now Patent No. 2,720,504, Serial No. 313,075, now Patent No. 2,727,881, and Serial No. 313,076, now Patent No. 2,720,505, and Wellman Serial No. 313,073 for a description of especially advantageous catalytic condensing agents.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

In general, the polyesters of this invention are significantly more soluble than those described in patent application 313,063 concerning interpolyesters filed by J. R. Caldwell on October 3, 1952, now Patent No. 2,744,091 which contain straight-chain aliphatic dicarboxylic compounds as the modifying agent.

For example, the polyester described in Example 1 which is set forth hereinbelow has the composition 0.5 mole sulfone acid+0.5 mole 1,4-endomethylene-2,3-cyclohexanedicarboxylic acid (9 carbon atoms)+1.0 mole tetramethylene glycol. This polyester dissolves in both hot tetrachloroethane and trichloroethane and moreover, it remains in solution when cooled to room temperature. The corresponding interpolyester made with azelaic acid (9 carbon atoms, straight chain) is insoluble in hot trichloroethane. Although it is soluble in hot tetrachloroethane it gels out at room temperature. No suitable solvents boiling below about 140° C. are known for this type of polyester.

The polyester herein described in Example 2 has the composition 0.6 mole sulfonyl dibenzoic acid+0.4 mole 1,4-endomethylene-2,3-cyclohexanedicarboxylic acid+1.0 mole tetramethylene glycol. It is soluble in tetrachloroethane, whereas the corresponding interpolyester made with azelaic acid is insoluble in tetrachloroethane. As mentioned above, no other low-boiling solvent is known for this type of polyester.

In order to prepare a solution of azelaic interpolyester it is believed to be necessary to use a solvent such as butyrolactone, ethylene carbonate, cresol, or sulfolane, all of which boil at 200° C. or higher.

It is thus apparent that the copolyesters made with the cyclic dicarboxylic acids are substantially more soluble than the corresponding ones made from the open-chain acids. This improved solubility is important because a wider range of solvents can be used in the preparation of films, fibers, coatings, etc.

It is important to exclude oxygen and moisture at all stages of the condensation reaction. Inert atmospheres which can be advantageously employed include nitrogen, hydrogen, helium, etc. Substantially anhydrous reactants can also be advantageously employed although this not essential, especially if any water is removed in the earlier stages of the condensation.

Examples of the various dicarboxylic compounds in the form of diesters which can be employed in accordance with the process of this invention include the ethyl, propyl, n-butyl, sec-butyl, isopropyl, sec-amyl, n-hexyl, 10-hydroxydecyl, 5-hydroxyamyl, 12-hydroxydodecyl, 2-hydroxyethyl, etc. diesters of either p,p'-sulfonyl dibenzoic acid or any of the cyclic aliphatic dicarboxylic acids described above. When the novel catalytic condensing agents described hereinabove and in copending applications referred to herein are employed, the simple alkyl esters of these various dicarboxylic acids can be advantageously employed, whereas if other catalysts known to the prior art are employed, the condensation will not proceed as rapidly or as effectively although satisfactory results can be obtained.

The cyclic aliphatic dicarboxylic acids encompassed within the scope of this invention can be selected from the group consisting of the ortho-, meta- and para-isomers of cyclohexane dicarboxylic acid, the ortho, meta- and para-isomers of 1,4-endomethylenecyclohexane dicarboxylic acid and the alkyl monoesters and alkyl diesters of all of these acids wherein the alkyl radicals contain from 1 to 6 carbon atoms.

Examples of these acids and their esters include: 1,4-endomethylenecyclohexane-1,4-dicarboxylic acid; cyclohexane-1,3-dicarboxylic acid; cyclohexane-1,2-dicarboxylic acid; the di-n-butyl ester of cyclohexane-1,4-dicarboxylic acid; the sec.-amyl diester of cyclohexane-1,2-dicarboxylic acid; the isopropyl diester of 1,4-endomethylenecyclohexane-1,3-dicarboxylic acid, etc.

Our novel interpolyesters may contain as constituents thereof small percentages of the m,m'-and/or the m,p'-isomers of the p,p'-sulfonyl dibenzoic compound without significant deleterious effect on the properties of these interpolyesters. In fact, when the interpolyester is to be employed for purposes other than for making fibers, substantial quantities of these isomers can be employed with some advantageous results, especially as regards increasing the softening temperature range. The same effect is produced when homologs of p,p'-sulfonyl dibenzoic acid are incorporated into the materials being condensed to prepare these interpolyesters. If homologs are employed they are most advantageously those of p,p'-sulfonyl dibenzoic acid, e. g. m,m'-dimethyl-p,p'-sulfonyl dibenzoic acid, o-ethyl-p,p'-sulfonyl dibenzoic acid, m-methyl-o-propyl-p,p'-sulfonyl dibenzoic acid, etc. Small proportions of various diesters of such isomers and homologs can be employed in substitution for a corresponding quantity of the diester of p,p'-sulfonyl dibenzoic acid when the interpolyester product is not intended to be used in the preparation of fibers.

The linear polyesters of this invention can be advantageously prepared by first forming a polymer as described hereinabove except that the final period of heating is cut short so as to yield a relatively low molecular weight polymer. This intermediate polymer can then be comminuted to form a powder. This powder can then be advantageously further polymerized by heating in an inert atmosphere or in a vacuum at a temperature of from about 170° C. up to about 2°–5° C. below the melting point of the powdered intermediate polymer. By using this solid phase build-up the highly polymeric polyesters produced have intrinsic viscosities that are exceptionally high. U. S. Patents 2,650,213, 2,647,885, 2,173,374 and others disclose various techniques of carrying out the solid phase build-up of exceptionally high polymers.

The products of this invention are linear interpolyesters which possess favorable flow characteristics over a temperature differential (or range) of about 5° to 20° C., a low modulus of elasticity and which contain in the interpolyester configuration a ratio of about 10 of one of the following repeating units:

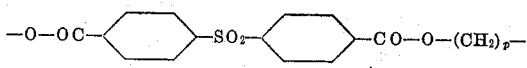

to each 1 to about 30 of one of the following repeating units:

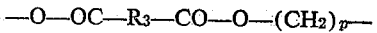

wherein the repeating units are connected by ester linkages, p is defined above and R₃ represents a divalent cyclic aliphatic radical selected from the group consisting of the ortho-, meta-, and para-isomers of cyclohexylene radicals and the ortho-, meta- and para-isomers of 1,4-endomethylenecyclohexylene radicals.

When the ratio of the repeating units is, respectively, from about 10:1 to about 10:2 these interpolyesters are especially valuable for being spun into fibers which can be cold drawn to from about 3 to 6 times their originally spun length and heat set thereby developing strong, elastic properties distinguished by a high degree of reversible extensibility. The interpolyesters having this same ratio of repeating units can be similarly formed into films and sheets by extrusion or casting followed by cold drawing and heat setting.

The above described interpolyesters can also have either one or both of the two types of repeating units depicted above replaced in part, respectively, by repeating units derived from ether glycols in lieu of the polymethylene glycols.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of 5/8 inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results:

*Example 1.—50:50 mole ratio of diesters plus tetramethylene glycol*

420 grams (1.0 mole) p,p'-sulfonyldibenzoic acid dibutyl ester together with 212 grams (1.0 mole) of endomethylenecyclohexane - 2,3 - dicarboxylic acid dimethyl ester and 270 grams (3.0 moles) of tetramethylene glycol were placed in a reaction vessel equipped with a stirrer, a distillation column, and an inlet for purified nitrogen. A solution of 0.2 gram of sodium titanium butoxide dissolved in 5 cc. of butyl alcohol was added as the catalyst. The mixture was then heated with stirring at 190–200° C. in an atmosphere of pure nitrogen. A mixture of butyl and methyl alcohols distilled as ester-interchange took place. The evaporation of the alcohols practically ceased after two hours. The temperature was then raised to 260° C. and held for thirty minutes. The pressure was reduced to 0.1 mm. of Hg pressure and stirring was continued for one hour at the same temperature. A high-viscosity colorless interpolyester was obtained. The inherent viscosity, as measured in a solution of 60% phenol and 20% tetratryethene was 0.72.

Some of the interpolyester of Example 1 was melt spun and the fibers obtained were cold drawn and heat-set to form strong elastic fibers that stuck on the hot bar at 200–210° C. The interpolyester as prepared in Example 1 is especially advantageous in the manufacture of photographic film base which can be coated with a light-sensitive silver halide emulsion and otherwise fabricated into a useful photographic film for either black-and-white or color photography. An additional quantity of the interpolyester of Example 1 was molded into small shaped objects. These objects had high impact strength and excellent dimensional stability. Such objects can be made by injection or by compression methods. Rods, tubes, sheets, ribbons, etc. can be formed by the usual extrusion methods. Because of its relatively wide range of softening temperature it has good flowing properties under the conditions used for molding. The products produced from this interpolyester by the various described methods retained their shape at temperatures up to 150–160° C.

*Example 2.—60:40 mole ratio of diesters plus tetramethylene glycol*

630 grams (1.5 moles) of p,p'-sulfonyldibenzoic acid dibutyl ester together with 212 grams (1.0 mole) of 1,4-endomethylene-cyclohexane - 2,3 - dicarboxylic acid dimethyl ester and 225 grams (2.5 moles) of tetramethylene glycol were placed in a reaction vessel equipped as described in Example 1. The procedure described in Example 1 was repeated exactly except that the final temperature during the latter part of the process was held at 270–275° C. instead of 260° C. The interpolyester obtained was essentially the same as that described in Example 1 except that fibers prepared from it stuck to the hot bar at 215–220° C. This product can be employed in a manner analogous to that described under Example 1.

*Example 3.—80:20 mole ratio of diesters plus pentamethylene glycol*

4 gram moles of p,p'-sulfonyldibenzoic acid diethyl ester together with one gram mole of 1,4 - endomethylenecyclohexane - 2,3 - dicarboxylic acid diethyl ester and 8 gram moles of pentamethylene glycol were placed in a reaction vessel as described in Example 1. A solution of 0.6 gram of potassium aluminum ethoxide dissolved in 10 cc. of ethyl alcohol was added as the catalyst. The mixture was then stirred in an atmosphere of pure hydrogen at 200–210° C. The distillation of ethyl alcohol was practically complete in two hours. The temperature was then raised to 265° C. where it was held for thirty minutes. The pressure was then reduced to 0.5 mm. of Hg pressure and stirring was continued for another 1.5 hours. The interpolyester obtained had an inherent viscosity of 0.78 in a solution of 60% phenol and 20% tetrachlorethane. This interpolyester was essentially the same as that described in the preceding examples.

Fibers were prepared from the interpolyester of Example 3 by melt spinning, cold drawing and heat-setting. The fibers obtained were strong elastic fibers that stuck to the hot bar at 190°–200° C. These fibers were readily dyed with cellulose acetate dyes. The interpolyester was readily molded in an injection press to give formed products having a high impact strength and excellent dimensional stability.

*Example 4.—80:20 mole ratio of diesters plus hexamethylene glycol*

4 gram moles of p,p'-sulfonyldibenzoic acid diethyl ester together with one gram mole of 1,4-endomethylene-cyclohexane-2,3-dicarboxylic acid diethyl ester, and 8 gram moles of hexamethylene glycol were placed in a reaction vessel as described in Example 1 and condensed in accordance with the process described in Example 3. The product obtained was essentially the same as that described in Example 3 except for a somewhat lower temperature at which fibers prepared from it stuck to the hot bar. These fibers were also readily dyed with cellulose acetate dyes.

*Example 5.—85:15 mole ratio of diesters plus pentamethylene glycol*

8.5 gram moles p,p'-sulfonyldibenzoic acid dibutyl ester together with 1.5 gram moles cyclohexane-1,2-dicarboxylic diethyl ester, and 15 gram moles of pentamethylene glycol were placed in a reaction vessel as described in Example 1 and treated in accordance with the process described in Example 1. The interpolyesters obtained were essentially the same as described in Example 1. Fibers which were melt spun, cold drawn and heat set were quite strong and elastic and can be dyed to dark shades with cellulose acetate dyes. These fibers stuck to the hot bar at 215–220° C.

Although the interpolyester of Example 5 is especially suitable for the manufacture of fibers, it can also be employed for injection or compression molding as described in Example 1. Moreover this interpolyester forms an excellent film by extrusion from a melt followed by cold drawing and heat-setting whereby the resulting film is an excellent photographic support for a light sensitive silver halide emulsion suitable for either black-or-white or color photography.

*Example 6.—70:30 mole ratio of diesters plus pentamethylene glycol*

7 gram moles of p,p'-sulfonyldibenzoic acid dibutyl ester together with 3 gram moles of cyclohexane-1,4-dicarboxylic acid diethyl ester and 10 gram moles of pentamethylene glycol were reacted in apparatus as described in Example 1 in accordance with the procedure therein described. The product obtained was essentially the same as that described in Example 1 except that the softening point was in the range of 170–180° C. This interpolyester was especially valuable for injection molding although it could also be compression molded or extruded. It was not considered to be as valuable as the higher melting interpolyesters when used as a fiber or photographic film base.

*Example 7.—60:40 mol ratio of diesters plus hexamethylene glycol*

6 gram moles of p,p'-sulfonyldibenzoic acid diethyl ester together with 4 gram moles of cyclohexane-1,3-dicarboxylic acid diethyl ester and 10 gram moles of hexamethylene glycol were reacted in similar apparatus according to the procedure described in Example 1. The interpolyester obtained had a softening point in a range of 150–160° C. This interpolyester was especially useful as a molding plastic.

*Example 8.—28.5:71.5 mole ratio of diesters plus ethylene glycol*

One gram mole of p,p'-sulfonyldibenzoic acid dibutyl ester together with 2.5 gram moles of cyclohexane-1,2-dicarboxylic acid and 3.5 gram moles of ethylene glycol were condensed in similar apparatus and in accordance with the process described in Example 1. The interpolyester obtained softened in the range of 150–160° C. This interpolyester was useful as molding plastic.

*Example 9.—50:50 mol ratio of diesters plus pentamethylene glycol*

1 gram mole of p,p'-sulfonyldibenzoic acid diethyl ester together with 1 gram mole of 1,4'-endomethylenecyclohexane-1,3-dicarboxylic acid diethyl ester and 3 gram moles of pentamethylene glycol were condensed in accordance with the procedure described in Example 1 except that the catalyst employed was 0.3 gram of titanium ethoxide i. e. Ti(OC₂H₅)₄ dissolved in 6 cc. of ethyl alcohol. The polyester obtained was essentially the same as that described in Example 1.

*Example 10.—80:20 mole ratio of diesters plus decamethylene glycol*

4 gram moles p,p'-sulfonyldibenzoic acid dihexyl ester together with one gram mole of the dihexyl ester of 1,4-endomethylenecyclohexane-1,3-dicarboxylic acid and 8 gram moles of decamethylene glycol were placed in a reaction vessel as described in Example 1 and condensed in accordance with the process described in Example 3. The product obtained was essentially the same as those described in Examples 6 through 8.

*Example 11.—70:30 mole ratio of diesters plus hexamethylene glycol*

7 gram moles of p,p'-sulfonyldibenzoic acid together with 3 gram moles of 1,4-endomethylenecyclohexane-1,4-dicarboxylic acid diamyl ester and 10 gram moles of hexamethylene glycol were reacted in the apparatus according to the procedure described in Example 1 except that the catalyst employed was 2 grams NaH(Zr(OC₄H₉)₆) dissolved in 40 cc. of n-butyl alcohol—see Caldwell application Serial No. 313,074. The product obtained was essentially the same as that described in Example 6.

*Example 12.—80:20 mole ratio of diesters plus pentamethylene glycol ester*

The process described in Example 3 was repeated exactly except that 8 gram moles of pentamethylene glycol diacetate were employed in lieu of the free glycol used in Example 3. The process was further differently characterized by the distillation of ethyl acetate from the reaction mixture in lieu of ethyl alcohol. The interpolyester obtained was essentially identical of that described in Example 3.

In addition to the practice of the invention illustrated by the preceding examples, it is readily apparent that other polyesters can be similarly prepared in accordance with the description set forth. Other catalysts which can be employed include litharge, zinc borate, calcium titanium butoxide, magnesium zirconium propoxide, dibutyltin diacetate, diethyldiphenyltin and dibutyltin oxide. Other isomers of the cyclic aliphatic dicarboxylic acid diesters can be employed in lieu of those referred to in the examples. Other reactants and conditions can also be varied.

What we claim is:

1. A process for preparing a linear polyester comprising (A) condensing about 10 mole proportions of a p,p'-sulfonyl dibenzoic diester having the formula:

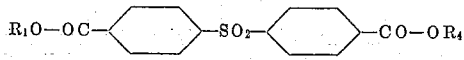

wherein $R_1$ and $R_4$ each represents a substituent selected from the group consisting of an omega-hydroxyalkyl radical containing from 2 to 10 carbon atoms and an alkyl radical containing from 1 to 6 carbon atoms, plus from about 1 to about 30 mole proportions of a cyclic aliphatic dicarboxylic diester selected from the group consisting of the alkyl and omega-hydroxyalkyl diesters of the ortho- meta- and para-isomers of 1,4-endomethylenecyclohexane dicarboxylic acid and the same diesters of the ortho-, meta- and para-isomers of cyclohexane dicarboxylic acid wherein the alkyl radicals contain from 1 to 6 carbon atoms and the omega-hydroxyalkyl radicals contain from 2 to 10 carbon atoms, (B) with a dioxy compound selected from the group consisting of polymethylene glycols containing from 2 to 10 carbon atoms and lower alkanoic mono- and diesters of these glycols wherein the alkanoic groups contain from 2 to 4 carbon atoms, the dioxy compound being employed in such a proportion that there is at least an equivalent amount of oxy substituents in proportion to the carboxy substituents in the overall combination of the diesters and the dioxy compound, (C) in the presence of an ester interchange catalytic condensing agent, (D) at an elevated temperature, (E) the condensation being conducted in an inert atmosphere, and (F) the latter part of the condensation being conducted at a very low pressure of the inert atmosphere.

2. A process as defined in claim 1 wherein the elevated temperature is increased gradually during the course of the condensation up to a temperature of from about 220° C. to about 300° C.

3. A process as defined in claim 2 wherein the condensing agent is employed in an amount of from about 0.005% to about 0.2% based on the weight of the diesters employed.

4. A process as defined in claim 3 wherein the dioxy compound is employed in such a proportion that there are from about 1.25 to about 2 oxy substituents in proportion to the carbalkoxy substituents in the overall combination of the diesters and the dioxy compounds.

5. A process as defined in claim 4 wherein the elevated temperature employed during the earlier part of the condensation is from about 170° C. to about 220° C. and the low pressure defined under (F) is less than about 1 mm. of Hg pressure.

6. A process as defined in claim 5 wherein all materials employed in the process are substantially anhydrous.

7. A process as defined in claim 6 wherein the dioxy compound is a polymethylene glycol containing from 2 to 10 carbon atoms.

8. A process as defined in claim 7 wherein the cyclic aliphatic dicarboxylic acid diester is 1,4-endomethylene-cyclohexane-2,3-dicarboxylic acid dimethyl diester and the dioxy compound is tetramethylene glycol.

9. A process as defined in claim 7 wherein the cyclic aliphatic dicarboxylic acid diester is 1,4-endomethyl-enecyclohexane-2,3-dicarboxylic acid diethyl diester and the dioxy compound is pentamethylene glycol.

10. A process as defined in claim 7 wherein the cyclic aliphatic dicarboxylic acid diester is 1,4-endomethylene-cyclohexane-2,3-dicarboxylic acid diethyl diester and the dioxy compound is hexamethylene glycol.

11. A process as defined in claim 7 wherein the cyclic aliphatic dicarboxylic acid diester is cyclohexane-1,2-dicarboxylic acid diethyl diester and the dioxy compound is pentamethylene glycol.

12. A process as defined in claim 1 wherein the sulfonyl dibenzoic diester is formed by a preliminary step comprising condensing p,p'-sulfonyl dibenzoic acid with a dihydroxy compound which is defined under (B) and is employed in the proportions set forth under (B), at an elevated temperature, after which preliminary step the condensing agent which is defined under (C) is added and the condensation is completed as defined under (D), (E) and (F).

13. A process as defined in claim 12 wherein the preliminary elevated temperature is substantially that at which reflux conditions subsist, the subsequent condensation being conducted at a temperature which is gradually increased during the course of the condensation up to about 280°–300° C. and the dioxy compound is employed in such a proportion that there are from about 1.2 to about 3 oxy substituents in proportion to the carboxy and carbalkoxy substituents in the overall combination of the diacids, diesters and dioxy compounds.

14. A process as defined in claim 1 wherein the aliphatic diester is formed by a preliminary step comprising condensing a cyclic aliphatic dicarboxylic compound selected from the group consisting of the ortho-, meta- and para-isomers of cyclohexane dicarboxylic acids, the ortho, meta- and para-isomers of 1,4-endomethylenecyclohexane dicarboxylic acid and the alkyl monoesters and alkyl diesters of all of these acids wherein the alkyl radicals contain from 1 to 6 carbon atoms, with a dioxy compound which is defined under (B) and is employed in the proportions set forth under (B), at an elevated temperature, after which preliminary step the condensing agent which is defined under (C) is added and the condensation is completed as defined under (D), (E) and (F).

15. A process as defined in claim 14 wherein the preliminary elevated temperature is substantially that at which reflux conditions subsist, the subsequent condensation being conducted at a temperature which is gradually increased during the course of the condensation up to about 280–300° C., and the dioxy compound is employed in such a proportion that there are from about 1.2 to about 3 oxy substituents in proportion to the carboxy and carbalkoxy substituents in the overall combination of the diacids, diesters and dioxy compounds.

16. A process as defined in claim 15 wherein the condensing agent is employed in an amount of from about 0.005% to about 0.2% based on the weight of the diesters being condensed, the elevated temperature employed during the earlier part of the condensation to form the interpolyester is from about 170° C. to about 220° C. and the low pressure defined under (F) is less than about 1 mm. of Hg pressure.

17. A linear interpolyester having a softening temperature range of from about 5° to 20° C. containing in the interpolyester configuration a ratio of about 10 of the following repeating units:

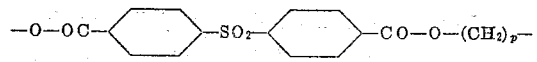

to each 1 to about 30 of one of the following repeating units:

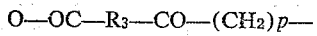

wherein $R_3$ represents a divalent radical selected from the group consisting of the ortho, meta and para isomers of 1,4-endomethylenecyclohexylene radicals and the ortho, meta and para isomers of cyclohexylene radicals, and $p$ represents a positive integer of from 2 to 10, which interpolyester has a relatively high degree of solubility in various solvents and is capable of being readily formed into shaped objects within its softening range.

18. A process as defined in claim 7 wherein the cyclic aliphatic dicarboxylic acid diester is cyclohexane-1,2-dicarboxylic acid diethyl ester and the dioxy compound is hexamethylene glycol.

19. A linear interpolyester as defined in claim 17 wherein the repeating units in the second formula of claim 17 have the following formula:

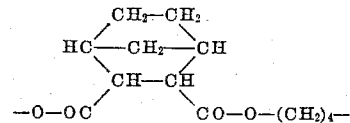

20. A linear interpolyester as defined in claim 17 wherein the repeating units in the second formula of claim 17 have the following formula:

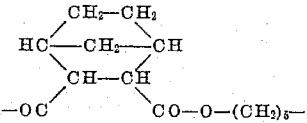

21. A linear interpolyester as defined in claim 17 wherein the repeating units in the second formula of claim 17 have the following formula:

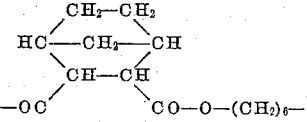

22. A linear interpolyester as defined in claim 17 wherein the repeating units in the second formula of claim 17 have the following formula:

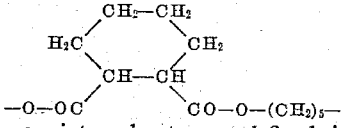

23. A linear interpolyester as defined in claim 17 wherein the repeating units in the second formula of claim 17 have the following formula:

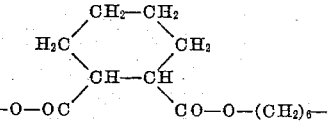

References Cited in the file of this patent

UNITED STATES PATENTS

| | | |
|---|---|---|
| 2,465,319 | Whinfield et al. | Mar. 22, 1949 |
| 2,511,621 | Condit | June 13, 1950 |
| 2,547,113 | Drewill et al. | Apr. 3, 1951 |
| 2,614,120 | Caldwell | Oct. 14, 1952 |

FOREIGN PATENTS

| | | |
|---|---|---|
| 465,383 | Canada | May 23, 1950 |